United States Patent
Niemann et al.

(10) Patent No.: US 9,464,941 B2
(45) Date of Patent: Oct. 11, 2016

(54) HIGH-TEMPERATURE SENSOR WITH A SENSOR ELEMENT AND A DEVICE FOR HOLDING AND POSITIONING THE SENSOR ELEMENT, ESPECIALLY FOR AUTOMOTIVE USES

(75) Inventors: Thomas Niemann, Delmenhorst (DE); Jürgen Palloks, Westerstede (DE)

(73) Assignee: Hella KGaA Hueck & Co., Lippstadt (DE)

( * ) Notice: Subject to any disclaimer, the term of this patent is extended or adjusted under 35 U.S.C. 154(b) by 519 days.

(21) Appl. No.: 14/002,720

(22) PCT Filed: Feb. 28, 2012

(86) PCT No.: PCT/DE2012/000187
§ 371 (c)(1),
(2), (4) Date: Sep. 26, 2013

(87) PCT Pub. No.: WO2012/116682
PCT Pub. Date: Sep. 7, 2012

(65) Prior Publication Data
US 2014/0016672 A1    Jan. 16, 2014

(30) Foreign Application Priority Data
Mar. 1, 2011    (DE) .......................... 10 2011 012 684

(51) Int. Cl.
*G01K 1/14*    (2006.01)

(52) U.S. Cl.
CPC ................ *G01K 1/146* (2013.01); *G01K 1/14* (2013.01); *G01K 2205/04* (2013.01)

(58) Field of Classification Search
CPC ..... G01K 1/14; G01K 1/146; G01K 2205/04
USPC ........................................................ 374/208
See application file for complete search history.

(56) References Cited

U.S. PATENT DOCUMENTS

| | | | |
|---|---|---|---|
| 5,048,974 A | 9/1991 | Dupuy | |
| 5,318,363 A | 6/1994 | Mauric | |
| 8,454,232 B2* | 6/2013 | Stoll | ............................. 374/142 |
| 2007/0000304 A1* | 1/2007 | Wild | .................. G01N 27/4062 73/23.31 |
| 2007/0277590 A1* | 12/2007 | Wilde | ................ G01N 27/4077 73/31.04 |
| 2009/0080492 A1* | 3/2009 | Takeuchi | .................. G01K 1/14 374/144 |
| 2010/0180675 A1* | 7/2010 | Schneider | ............. G01F 1/6845 73/114.31 |
| 2012/0237402 A1* | 9/2012 | Cantarelli | ........... F02D 41/1448 422/111 |

FOREIGN PATENT DOCUMENTS

| | | |
|---|---|---|
| CH | 647 867 A5 | 2/1985 |
| DE | 42 43 261 C2 | 8/1999 |
| DE | 102 12 908 A1 | 11/2002 |
| DE | 10 2007 021 763 A1 | 11/2007 |
| DE | 199 04 419 B4 | 6/2008 |
| DE | 10 2007 024 865 A1 | 12/2008 |
| JP | 2004 045 060 A | 2/2004 |

* cited by examiner

*Primary Examiner* — Lisa Caputo
*Assistant Examiner* — Philip Cotey
(74) *Attorney, Agent, or Firm* — Muncy, Geissler, Olds & Lowe, P.C.

(57) ABSTRACT

A high-temperature sensor comprising a sensor element and a device for holding and positioning the sensor element in a point of use, especially for automotive uses, has a holding part with a pouch molded into it in which the sensor element is received such as to be flush with the surface. In this way, the sensor element is reliably held in a high-temperature sensor and its safe operation is guaranteed also when the sensor is subject to vibrations.

11 Claims, 1 Drawing Sheet

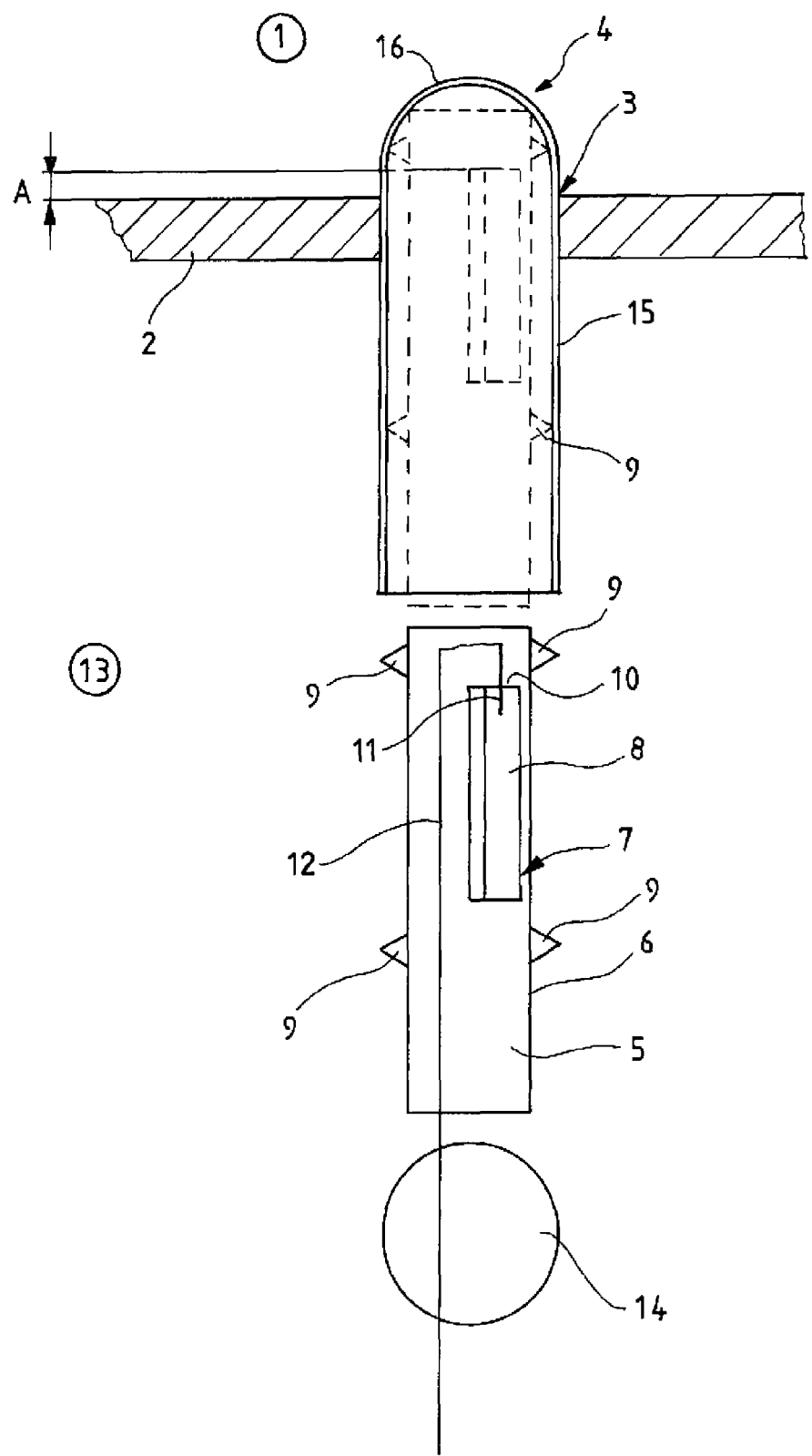

HIGH-TEMPERATURE SENSOR WITH A SENSOR ELEMENT AND A DEVICE FOR HOLDING AND POSITIONING THE SENSOR ELEMENT, ESPECIALLY FOR AUTOMOTIVE USES

The invention relates to a high-temperature sensor comprising a sensor element and a device for holding and positioning the sensor element at its point of use, in particular for automobile applications.

In known high-temperature sensors, contact wires are guided to the point of use of a sensor element. The point of use can be located, for example, in an exhaust gas system of an internal combustion engine as is specified in DE 10 2007 021 763 A1. For this purpose not only the sensor element but also its contact wires and other metal parts required for its mounting on or in an exhaust gas manifold must be designed in such a manner that both the individual elements of the high-temperature sensor and also its contact regions can withstand the same expansions over a temperature range of for example −40° Celsius to 1050° Celsius during the entire life of the automobile with enormous vibrational stresses.

The invention solves the previously described problem by the features of claim 1. Further developments of the solution according to the invention and advantageous or preferred embodiments are obtained from claims 2 to 8. Further aspects of the invention are claimed in claims 9-11.

The high-temperature sensor comprising a sensor element and a device for holding and positioning the sensor element at its point of use, in particular for automobile applications is characterised by a holding part with a pouch-like moulding for the flush receipt of the sensor element.

The sensor element is preferably an electronic component which is substantially similar to a populated circuit board. The holding element fulfils the purpose of holding such a sensor element which is used to determine or measure a temperature in the correct position relative to the point of use. The point of use is, for example, the position at which a temperature prevailing there is to be determined. To this end the holding part has a pouch-like moulding in which the sensor element can be inserted flush. The dimensions of the moulding are such that the sensor element sits relatively taut and therefore free from play in the moulding.

The holding part advantageously has the shape of a rectangular prism where the moulding is a notch corresponding to the rectangular prism shape in one of the longitudinal side surfaces of the rectangular prism. Naturally the holding part can also have other shapes but it has been shown that the shape of a rectangular prism can be produced relatively simply.

The moulding is particularly advantageously disposed offset on one side in the holding part relative to the longitudinal extension of the holding part. As a result of this measure of one-sided offsetting, one end of the holding part projects further over the moulding than the respectively opposite subsection. The subsections remaining on both sides of the moulding are therefore of unequal length and can therefore advantageously serve as spacers. With such spacers a predefined distance can be maintained between the sensor element and a wall component of a wall, for example, the wall of an exhaust gas channel, with the result that the positioning during mounting is substantially facilitated.

It is preferable to predefine the distance of the sensor element to the measurement site in the exhaust gas system by the respectively shorter subsection of the holding part, where the respectively longer subsection at the opposite end predefines the distance from a spacer body of a row of spacer bodies which serve to space the contact wires from, for example, metal walls surrounding the point of use.

The sensor element has outgoing parallel connecting wires, whose free ends are connected to the respectively associated contact wire. Here the arrangement is made in such a manner that the spacing between the connecting wires is greater than the thickness of the holding part. As a result, the connecting wires can either grip beyond the corresponding outer surfaces of the holding part towards the short subsection or towards the back towards the longer subsection. The contact wires can also be guided past the holding part up to the connecting wires of the sensor element in order to produce a mutual electrically conductive connection.

An installation group is advantageously formed from the holding part fitted with a sensor element and respectively associated spacer bodies, which is inserted into a surrounding housing. In a preferred embodiment the housing has the form of a sleeve which is closed at one sleeve end.

The sleeve preferably consists of a polymer ceramic.

The housing can be combined with an exhaust gas channel such that the closed sleeve end is exposed to the exhaust gas flowing in the exhaust gas channel. The installation group with the sensor element is thereby advantageously received in the sleeve in such a manner that the sensor element is positioned and held protected in the vicinity of the closed sleeve end and as a result of the different-length subsections of the holding element for the sensor element, advantageously at a predetermined distance from the sleeve end.

Since the material for the holding part is a polymer ceramic and also the sleeve can be made of polymer ceramic, the thermotechnical requirements on the components of the high-temperature sensor are satisfied. Polymer ceramic additionally has the advantage that components can be manufactured from this by injection moulding. Thus, the advantage can be used in the invention that the holding part, spacer body and housing can be made as polymer ceramic injection moulded parts. In this case, it is a preferred measure to form the holding part from the runner for a spacer body disposed adjacently in the respective installation group. This has the advantage that no particular tool is required to manufacture the required holding parts. It is sufficient to form the runner of an injection mould so that after demoulding the injection-moulded parts can be removed from the mould in the region of the runner.

Naturally it would also be possible to fit an injection mould with inserts consisting of pre-fabricated installation groups which are then overmoulded accordingly with polymer ceramic.

By this means a complete installation group consisting of holding part, spacer body and sensor element which is already connected via its connecting wires to the contact wires to be inserted can thus be manufactured by injection moulding.

A further aspect of the invention consists in providing a holding part with a pouch-like moulding to receive a sensor element for a high-temperature sensor described above. The invention also claims protection for the provision of an exhaust gas system for an engine, in particular an internal combustion system of an automobile, comprising a high-temperature sensor described above, where the high-temperature sensor is inserted with a sleeve end through a gap in the wall into the exhaust gas channel formed in the exhaust gas system, where the holding part provided in the high-temperature sensor with the sensor element received therein is disposed at a defined position in the front part of the high-temperature sensor which is inserted into the exhaust gas channel.

The drawing shows an exemplary embodiment from which further inventive features are obtained. The drawing shows a side view of a wall of an exhaust gas channel with built-in high-temperature sensor in section.

The wall 2 defining the exhaust gas channel 1, for example, the metal wall of an exhaust manifold, has a gap 3 in which a high-temperature sensor 4 is inserted so that the exhaust gas temperature in the exhaust gas channel 1 can be measured.

The high-temperature sensor comprises a holding part 5 which has the shape of a rectangular prism and is made of polymer ceramic. The upper longitudinal side surface of the holding part 5, which is here designated by 6, has a pouch-like moulding 7 which is a notch in the longitudinal side surface 6 of the holding part 5 present as a rectangular prism.

A sensor element 8 present as a rectangular plate is inserted flush in the moulding 7. All the longitudinal side surfaces of the holding part 5 are fitted with spacer lugs 9 shown here as triangular.

Connecting wires 11 project from the front side 10 of the sensor element 8, which are connected to the contact wires 12 running laterally past the holding part, as is indicated here. The contact wires of which only the contact wire 12 is visible run on both sides of the holding part 5 parallel into the surroundings designed by 13 of the exhaust gas channel 1 separated therefrom by the wall 2.

A spherical spacer body is designated by 14, which is intended to prevent the contact wires 12 contacting a housing 15 accommodating the installation group of spacer bodies 14 and holding part with sensor element.

Such a housing 15 is a component of the high-temperature sensor 4. The housing has the shape of a sleeve with a closed sleeve end 16.

The housing 15 present as a sleeve is pushed through the hole 3 in the wall 2. The dashed lines indicate how the holding part with the sensor element 8 accommodated in its pouch-like moulding 7 is accommodated in the inserted position in the housing 15. The drawing indicates that in this accommodated position the sensor element 8 has a distance A which can be predetermined by the dimensions of the components from the wall 2 defining the exhaust gas channel 1. The dimensions of the housing and in particular of the holding part with its pouch-like moulding can thus ensure that the sensor element is always positioned and held in its envisaged position.

The invention claimed is:

1. A high-temperature sensor comprising a sensor element and a device for holding and positioning the sensor element at its point of use, comprising:
   a holding part with a pouch-like moulding in which the sensor element is received flush,
   the moulding is offset on one side in the holding part relative to the longitudinal extension of the holding part, and
   the subsections of the holding part remaining on both sides of the moulding have dimensions corresponding to the offset and are configured as spacers for predefining the distance between the sensor element and a wall component of a wall defining the point of use of the high-temperature sensor and a spacer body of a row of spacer bodies, which are held only by contact wires, the contact wires being the only connection between the spacer bodies and the holding part, the spacer bodies having no direct connection to a wall component of the wall.

2. The high-temperature sensor element according to claim 1, wherein the holding part has the shape of a rectangular prism and the moulding is a notch in one of the longitudinal side surfaces of the rectangular prism.

3. The high-temperature sensor element according to claim 1, wherein the sensor element has outgoing parallel connecting wires, whose free ends are connected to the respectively associated contact wire, wherein the spacing between the connecting wires is greater than the thickness of the holding part.

4. The high-temperature sensor element according to claim 1, wherein an installation group is formed from the holding part fitted with a sensor element and respectively associated spacer bodies, which is inserted into a surrounding housing.

5. The high-temperature sensor element according to claim 4, wherein the housing has the form of a sleeve which is closed at one sleeve end.

6. The high-temperature sensor element according to claim 1, wherein the material for the holding part is a polymer ceramic.

7. The high-temperature sensor element according to claim 4, wherein the holding part, spacer body and housing are polymer ceramic injection moulded parts.

8. The high-temperature sensor element according to claim 7, wherein the holding part is formed from a runner for the spacer body disposed adjacently in the respective installation group.

9. A holding part for a pouch-like moulding for a high-temperature sensor according to claim 1.

10. An exhaust gas system for an engine, comprising a high-temperature sensor according to claim 1, wherein the high-temperature sensor is inserted with a sleeve end through a gap in the wall into the exhaust gas channel formed in the exhaust gas system,
   wherein the holding part provided in the high-temperature sensor with the sensor element received therein is disposed at a defined position in the front part of the high-temperature sensor which is inserted into the exhaust gas channel.

11. The exhaust gas system for an engine of claim 10, wherein the system is an internal combustion system of an automobile.

* * * * *